United States Patent

[11] 3,592,080

| [72] | Inventors | Jury Petrovich Samatov<br>Prospekt Lenian, 22, kv. 30;<br>Mikhail Davidovich Goldin, ulitsa<br>Tankistov, k44a, kv. 31; Evgeny Ivanovich<br>Tarakanov, ulitsa Bazhova, 36a, kv. 27;<br>Vladimir Vasilievich Emelyanenko, ulitsa<br>Turistov, 106, kv. 39; Ivan Savvateevich<br>Kaviarov, prospekt Lenina, 15, kv. 20;<br>Vladimir Sergeevich Malchikov, 2<br>Sadovaya ulitsa, 19, kv. 23., all of<br>Chelyabinsk, U.S.S.R. |
|---|---|---|
| [21] | Appl. No. | 834,967 |
| [22] | Filed | June 20, 1969 |
| [45] | Patented | July 13, 1971 |

[54] TRANSMISSION GEARBOX, PREFERABLY FOR USE IN A TRACTOR
8 Claims, 4 Drawing Figs.

| [52] | U.S. Cl. | 74/740, 74/15.66 |
|---|---|---|
| [51] | Int. Cl. | F16h 37/00, B60k 17/28 |
| [50] | Field of Search | 74/740, 15.66 |

[56] References Cited
UNITED STATES PATENTS

| 2,254,335 | 9/1941 | Vincent | 74/740 |
| 3,152,491 | 10/1964 | Wiggermann | 74/740 |
| 3,255,644 | 6/1966 | Warren et al. | 74/745 |
| 3,318,168 | 5/1967 | De Castelet | 74/359 |
| 3,357,276 | 12/1967 | Vavulo et al. | 74/740 |
| 3,396,610 | 8/1968 | Rich, Jr. et al. | 74/740 |
| 3,429,202 | 2/1969 | Galicher | 74/740 |

FOREIGN PATENTS

| 1,073,876 | 1/1960 | Germany | 74/740 |

*Primary Examiner*—Arthur T. McKeon
*Attorney*—Waters, Roditi, Schwartz & Nissen ABSTRACT: A transmission gearbox, for use with a tractor or the like comprising a housing, an input shaft located within the housing and being provided with a driving member and a driven member, a coupling element connecting the driving and driven members, layshafts located within the housing, continually mesh in gears operatively communicating with the input shaft and layshafts for transmitting torque from the input shafts and layshafts, friction clutches causing the continually mesh gears to communicate with the layshafts, output shafts are lined with the layshafts, and reversing coupling gears into locking when a forward speed is provided by the gearbox and for connecting the output shaft to the layshaft when a reverse speed is provided.

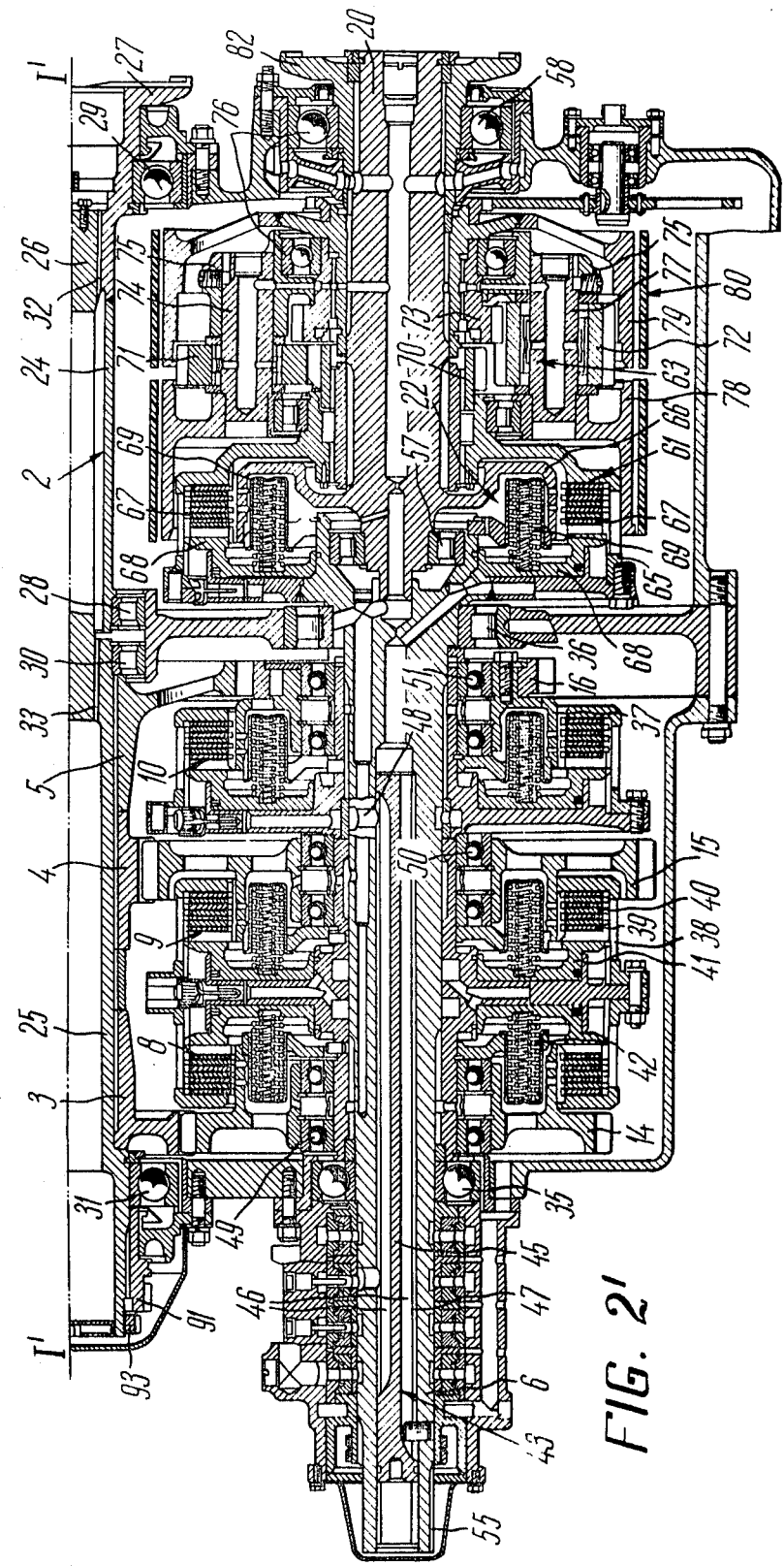

TRANSMISSION GEARBOX, PREFERABLY FOR USE IN A TRACTOR

The present invention relates to the tractor and machine building industry and in particular, to power transmission gearings employed in traction and transport vehicles, and even more specifically, to gearboxes used preferably in transmission gearings of tractors with independent side power control or takeoffs.

It is known to use transmission gearboxes in which their input or drive gear shaft is connected through a train of constant mesh gears and friction clutches to transmission countershafts or layshafts, connected, in turn to the transmission main or output shafts.

The gearbox with independent side power control incorporates four longer parallel shafts and two shorter shafts, as well as a power takeoff (PTO) shaft, which fact complicates the design and increases the overall dimensions of the gearbox. The drive or input shaft of the gearbox carries two gears rigidly mounted thereon, the gears being in constant mesh with the countershaft or layshaft gears which are coupled to the latter via friction clutches. In addition, another two gears are rigidly mounted on the layshaft, the gears being associated with two main shafts via a train of constant mesh gears and friction clutches, while to effect reverse movement, another two idler gears are provided, said gears being mounted on the shorter shafts between the layshaft gear and the output shaft gears.

Thus, to provide two forward and two reverse speeds, six friction clutches and eight pairs of gears are required. For either forward or reverse speed engaged, eight or nine gears and three friction clutches are in motion. Such a great number of gears for the power transmission results in considerable power losses due to the friction in the gear meshing. For both forward and reverse speeds using friction clutches leads to increased power losses due to the friction plates rotating towards each other in both cases.

The present design of the gearbox fails to increase the range of speeds without requiring a redesign, to increase or reduce the running speed of a tractor when used with various mounted and towed implements and tools. Furthermore, the gearbox of the above-discussed design cannot be used as a reducing gear unit in case the tractor is employed as a stationary source of power to drive hauling machinery, such as winch; since no provision is made in the above-said gearbox for a synchronous power takeoff from the layshafts for powering other mechanisms with the gearbox operating. To derive power from the input shaft, use is made of an auxiliary shaft with a gear train, which likewise complicates the gearbox design. Lubricant is supplied to the friction clutches through deep bores made in the shafts, the bores having additional technological difficulties.

A specific object of the present invention to provide a simple and relatively small-sized gearbox which would ensure highly efficient and durable transmission gearing, separate reversing of the main shafts, make provision for auxiliary reducing gears (both step-up and stepdown) to efficiently use the traction vehicle such as a tractor and the mounted, semimounted and towed implements and tools employed, enable power takeoff from all the shafts of the gearbox at all speeds, including the situations where the main shafts are motionless and the gearbox is employed as a multiple-gearing reduction unit.

This object is accomplished by providing an input shaft in the herein-disclosed gearbox composed of a driving member and a driven member interlinked by a coupling element, whereas the output shafts are set in alignment with the layshafts and are associated therewith by reverse coupling gears adapted to be interlocked for any of the forward speeds.

It is another object of the present invention to provide a small-sized and simple gearbox.

It is another object of the present invention to provide high-efficiency and durable power transmission gearing for disclosed gearbox.

It is yet another object of the present invention to provide for the main or output shafts to be reversed independently of each other.

It is still another object of the present invention to make provision for the employment of auxiliary reducing gear units (both step-up and stepdown) to optimize the combined performances of both the traction vehicle (such as tractor) and the mounted semimounted and towed implements and tools employed.

One of the further objects of the present invention is to provide for power takeoff from all the shafts of the gearbox when operated at any speed, including the cases where the output shafts are motionless and the gearbox is employed as a multiple-gearing reduction gear.

In keeping with these and other objects the essence of the invention resides in the fact, that the gearbox input shaft is made up of a driving member and a driven member interconnected by a coupling element, while the gearbox output shafts are aligned with the layshafts and are associated therewith by reverse coupling gears adapted to be interlocked for forward speeds.

It is preferable, that both members of the gearbox input shaft be hollow and interconnected by a torsion bar, and that use be made of planetary or epicyclic reducing gears with friction clutches as the coupling reversing gears.

It is likewise desirable, that the driving member of the gearbox input shaft be linked through a torsion bar to the driving members of an auxiliary reducing, gear unit mounted on the gearbox housing, while the output members of the reducing gear unit are linked to the driven member of the gearbox input shaft.

It is also preferable that the output members of the planetary reduction gears be rigidly coupled to the band brake arrangements.

Further objects and advantages of the present invention will become apparent hereinbelow from a detailed description to be had in conjunction with the accompanying drawings, wherein.

Figure 2:
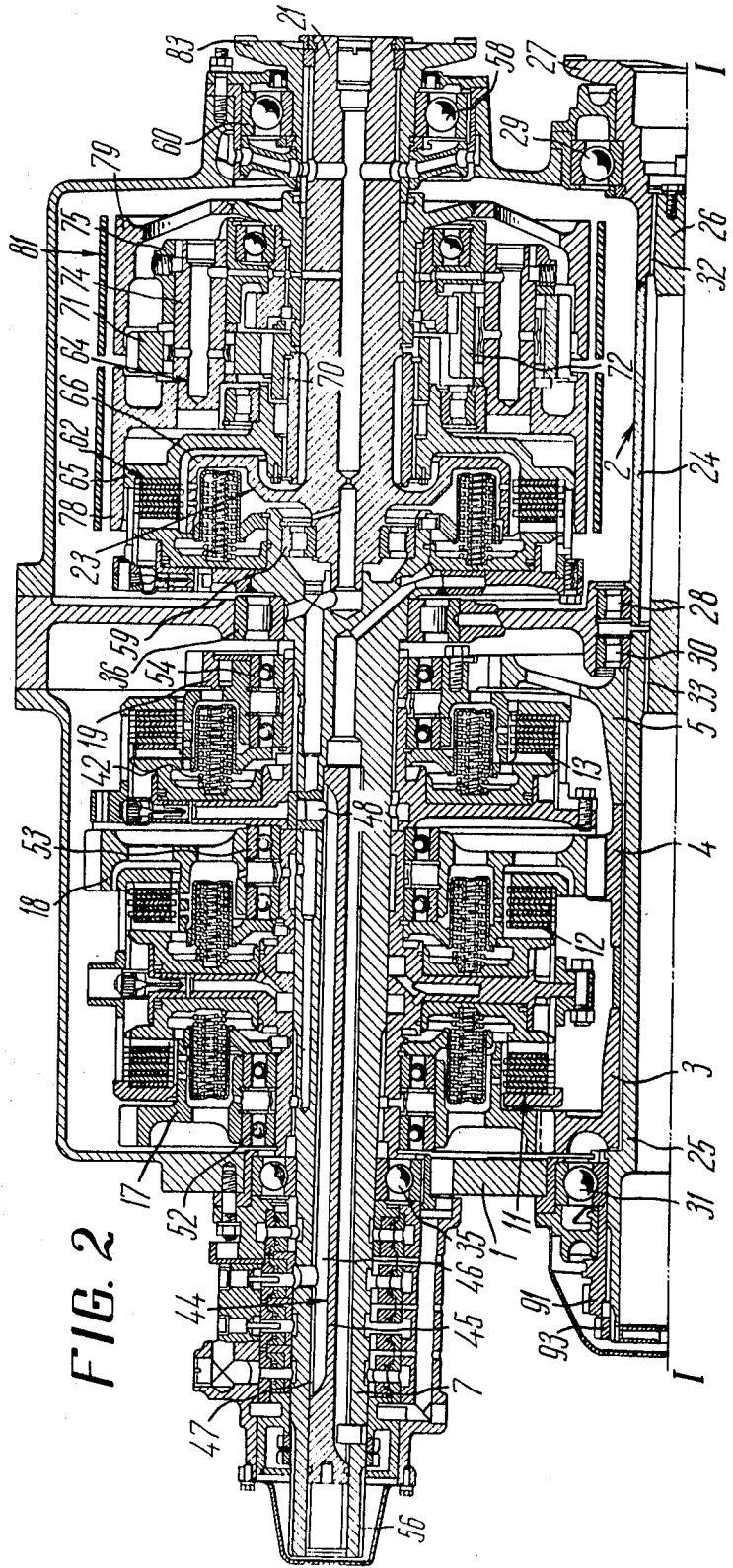
FIG. 2 is a longitudinal section view of the right half of the transmission
Figure 3:
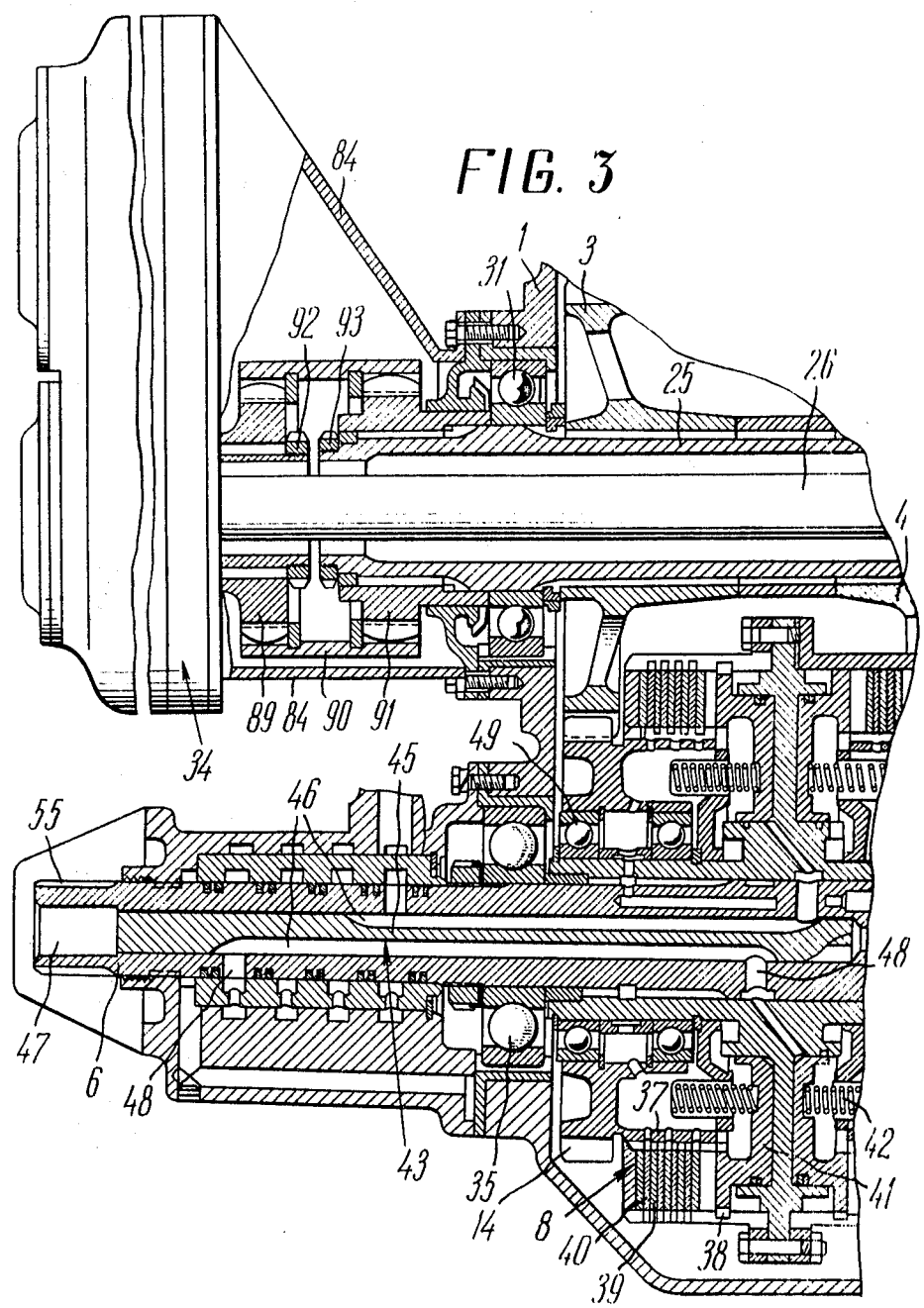

FIG. 2' is a longitudinal section view of the left half of the transmission gearbox of the invention; and FIG. 3 is a longitudinal section view showing the association of the gearbox input shaft with the layshaft through an auxiliary reducing gear unit.

In the description of the particular embodiment of the invention disclosed hereinbelow, specific terms are used for the sake of clarity. It should be understood, however, that the present invention is in no way limited to the terms so selected and that each such term covers all equivalent elements operating in a similar manner and employed for solving similar problems.

Figure 1:
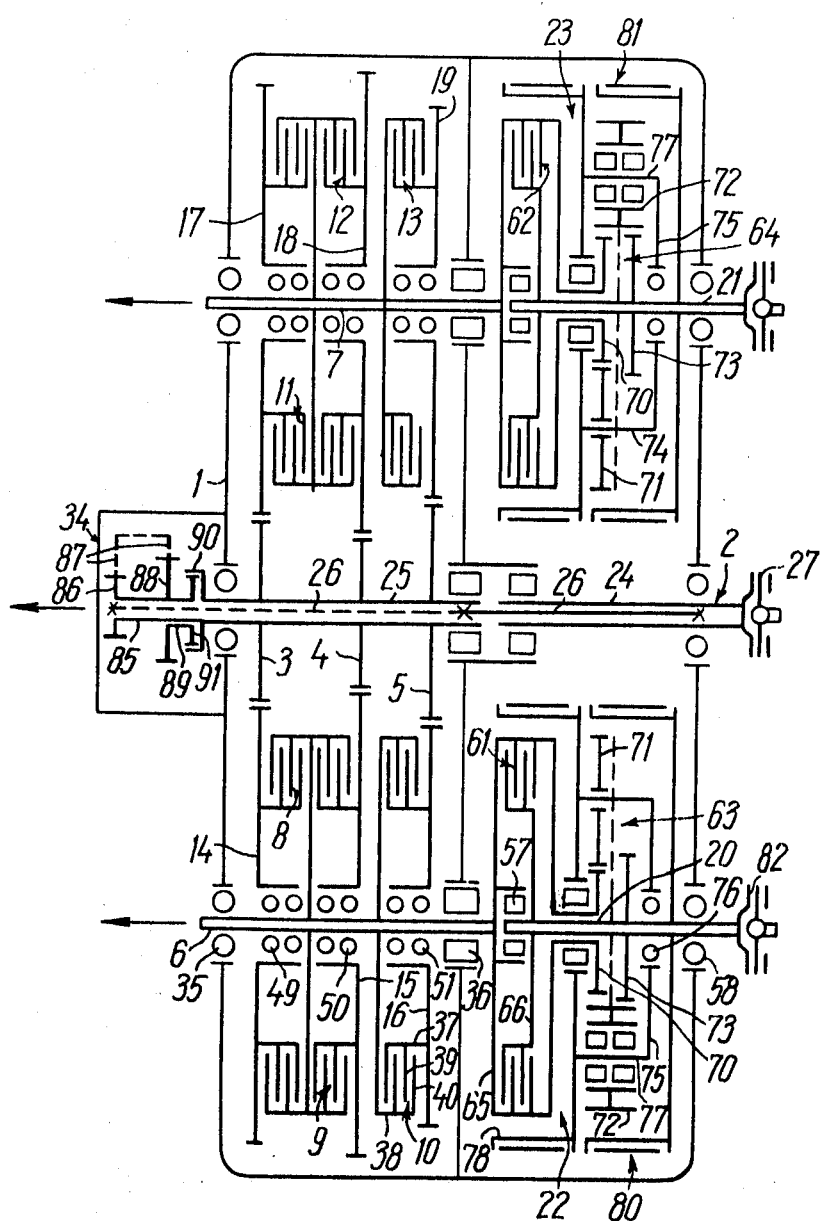
FIG. 1 illustrates a gearing diagram of the herein-disclosed tractor transmission gearbox.

Now referring to FIGS. 1 and 2, the transmission gearbox comprises a housing 1; an input or drive gear shaft 2 located inside said housing and having drive pinions 3, 4, 5 set on external splines thereof; layshafts 6, 7 arranged likewise inside the gearbox housing parallel to the input shaft and carrying friction clutches 8, 9, 10 and 11, 12, 13 driven gears 14, 15, 16 and 17, 18, 19, respectively, the latter gears continually meshing with the corresponding drive pinions 3, 4, 5; output shafts 20 and 21 set, according to the invention in alignment with the respective above-said layshafts; and reversing gears 22 and 23 mounted respectively on the output shafts to associate these with the layshafts.

According to the invention, the gearbox input shaft 2 is made up of two hollow members, an input shaft or driving member 24 and a drive shaft or driven member 25 interlinked by a coupling shaft or element 26, for which purpose a torsion bar is used. The input shaft or driving member 24 of the input shaft 2 is rigidly associated with a flange 27 of the universal joint sleeve (not shown in the drawing), through which the shaft 2 is associated with the engine drive (crank) shaft (not shown in the drawings).

The input shaft 24 of the input shaft 2 mounted inside the housing 1, with one of its ends rests in a bearing 28 and with the other end, in a bearing 29 with the help of the flange 27.

The drive shaft 25 of the input shaft 2 located likewise inside the housing 1, with one end resting in a bearing 30, while its other end is fitted in a bearing 31.

The driving member or input shaft 24 and the driven member or drive shaft 25 of the input shaft 2 are interlinked through the torsion bar by way of splined joints 32 and 33.

The drive pinions 3, 4 and 5 are spline jointed on the drive shaft 25 of the gearbox input shaft 2.

The provision of the gearbox input shaft composed of the two hollow members, viz., of the input shaft 24 and drive shaft 25, makes it possible, according to the invention, to interconnect both members, by virtue of a long torsion bar, through an auxiliary reducing gear unit 34 (FIG. 3) provided on the gearbox housing 1 at the end of the drive shaft 25, the reducing gear unit being advantageous when the present gearbox is utilized in the transmission gearings of tractors where higher running speed, greater drawbar pull or traction power and wider range of speed gears are desired.

The layshafts 6 and 7 (FIG. 1 and 2) located in the housing 1, are set in bearings 35 and 36.

The friction clutches 8, 9, 10 and 11, 12, 13 mounted on the respective layshafts, consist respectively of driving drums 37, driven drums 38, driving friction discs 39, driven friction discs 40 and pistons 41 with return springs 42.

The pistons 41 are actuated by power fluid fed thereto through special distribution devices 43 and 44 incorporated in the respective layshafts 6 and 7.

Each of the distribution devices to feed power fluid to the pistons 41 of the respective friction clutches 8, 9, 10 and 11, 12, 13, 51 made as a stem 45 provided with longitudinal passageways or ducts 46 and fitted into a longitudinal bore 47 of the respective layshafts 6 and 7 that have radial bores 48 for power fluid to pass to the corresponding pistons 41.

The driven gears 14, 15, 16 and 17, 18, 19 of the respective layshafts 6 and 7 are set in bearings 49, 50, 52 and 52, 53, 54, correspondingly.

The vacant ends of the layshafts 6 and 7 have respective splines 55 and 56, to associate the shafts with the PTO shaft or shafts, either in case of synchronous power takeoff or with power takeoff from a stationary tractor, respectively. In the latter case the output shafts 20 and 21 are disengaged by means of the respective reversing gears 22 and 23.

The output shafts 20 and 21, according to the invention, are set in alignment with the respective layshafts 6 and 7 mounted inside the gearbox housing 1 by means of bearings 57, 58 and 59, 60, correspondingly, and communicate with the layshafts via the respective reversing coupling gears 22 and 23.

The reversing coupling gears 22 and 23 consist accordingly of friction clutches 61 and 62 and epicyclic reducing or planetary reducing gears 63 and 64.

Each of the friction clutches 61 and 62 comprises a driving drum 65, a driven drum 66, a set of driving and driven discs 67 and a piston 68 with return springs 69.

The driving drums 65 of the respective friction clutches 61 and 62 are mounted on the corresponding layshafts 6 and 7, whereas their driven drums 66 are made integral with the respective output shafts 20 and 21.

Each of the planetary reduction gears 63 and 64 comprises: an input (primary) floating sun gear 70, smaller diameter planet pinions 71, larger diameter planet pinions 72 and an output (secondary) sun gear 73.

The input sun gears 70 are made floating and are linked to the driving drums 65 of the respective friction clutches 61 and 62.

The smaller planet pinions 71 are set on pins 74 made fast in a pinion carrier 75 which, in turn, is mounted by means of a bearing 76 on the respective output shaft 20 or 21, the pinions being in mesh with the respective input sun gears 70.

The larger planet pinions 72 are set on pins 77 made fast in the pinion carrier 75 and are in mesh with the smaller planet pinions 71 and with the output sun gear 73 of the respective planetary reduction gear 63 and 64.

The pinion carrier 75 is connected to a brake drum 78 of the respective epicyclic reducing gear 63 or 64 by means of the pins 74 and 77 of the planet pinions 71, 72.

The output sun gears 73 are set on the splines of the respective drum 79 of band or stopping brake arrangements 80 and 81.

The drums 79 fixedly communicate with the corresponding output shafts 20 and 21.

Flanges 82 and 83 are mounted on one of the ends of each of the output shafts 20 and 21 which protrude outside the gearbox housing and are spline-jointed therewith to effect a universal joint with the corresponding side transmission gears drives of the tractor (not shown in the drawings).

The auxiliary reducing gear unit 34 appearing in FIG. 3 is of a conventional design, its communication with the long-sized torsion bar and with the drive shaft 25 of the input shaft 2 being indicated with a dotted line in the gearing diagram of FIG. 1 and constructionally in FIG. 3.

The auxiliary reducing gear unit 34 is made fast to the gearbox housing 1 with the help of a bracket 84 (FIG. 3).

The long-sized torsion bar is coupled to a reducing gear shaft 85 (FIG. 1) (indicated with a dotted line in the drawing) which carries a sprocket or drive pinion 86 meshed with intermediate sprockets or gears 87, the latter being, in turn, in mesh with a sprocket or driven gear 88 of a half-coupling 89 loosely set on the shaft 85 of the reducing gear unit. The half-coupling 89, in turn, is associated through a linking member 90 with a half-coupling 91 connected to the driven member 25 of the gearbox input shaft 2.

The half-couplings 89 and 91 are kept in position by nuts 92 and 93, respectively.

In the herein-disclosed tractor transmission gearbox, torque is transmitted, according to the invention, as follows.

From the engine drive (crank) shaft of a tractor (not shown in the drawing) torque is imparted to the gearbox input shaft 2. Then from the driving member or input shaft 24 of that shaft via the torsion bar it is transmitted to the driven member or drive shaft 25 thereof and to the drive pinions 3, 4 and 5. With the tractor operating on, say, the first speed, torque is delivered to the layshafts 6 and 7 through the drive pinion 4 and the driven gears 15 and 18 with the friction clutches 9 and 12, the driven gears continually meshing with the drive pinion 4.

Engagement of the friction clutches 9 and 12 is by virtue of power fluid fed via one of the passageways 46 of the distribution devices 43 and 44 and through one of the bores 48 in the respective layshafts 6 and 7, to the space under the pistons 41 of the corresponding friction clutches 9 and 12. When actuated by the pressure exerted by power fluid, the pistons 41 exercise pressure upon both the driving discs 39 and the driven discs 40 of the respective friction clutches 9 and 12. The friction clutches having been engaged, torque is transmitted from the driven gears 15 and 18 to the respective layshafts 6 and 7.

From the layshafts 6 and 7 torque is imparted to the corresponding gearbox output shafts 20 and 21 by means of the respective reversing gears 22 and 23.

To provide tractor forward motion, the layshafts 6 and 7 are thrown into gear by engaging the respective friction clutches 61 and 62 of the corresponding reversing coupling gears 22 and 23, the friction clutches being engaged by virtue of power fluid fed along one of the passageways 46 of the distribution devices 43, 44 and through one of the bores 48 in the respective layshafts 6 and 7, to the space under the pistons 68 of the respective friction clutches 61 and 62, whereupon the pistons 68 are actuated by the pressure exerted by power fluid so as to compress the set of friction discs 67 overcoming the force of the springs 69 of the respective friction clutches 61 and 62.

The friction clutches 61 and 62 having been engaged, torque from the layshafts 6 and 7 is transmitted to the respective output shafts 20 and 21 via the driven drums 66 each of which is made integral with the corresponding output shaft.

For reversing the output shafts 20 and 21, the friction clutches 61 and 62 of the respective reversing gears 22 and 23 are to be disengaged and the brake drums 78 of the corresponding planetary reduction gears 63 and 64 are to be stopped.

In the latter case torque from the layshafts 6 and 7 is imparted to the respective output shafts 20 and 21 through a gear train comprising the driving drums 65 of the friction clutches 61 and 62, the input floating sun gears 70, the smaller planet pinions 71, the larger planet pinions 72 and the output sun gears 73 of the respective planetary reduction gears 63 and 64.

Braking of the output shafts 20 and 21 is effected by means of the respective stopping brake arrangements 80 and 81 whose drums 79 are rigidly coupled to the respective output shafts 20 and 21.

As soon as the torque is no longer imparted from the drive shaft 25 of the input shaft 2 to the layshafts 6 and 7, pressure of power fluid in the space under the pistons 41 of the respective friction clutches 9 and 12 is released, the pistons 41, under the action of the return springs 42, are caused to return into the initial position where the driving friction discs 39 and the driven discs 40 are disengaged from each other and the transmission of torque to the layshafts 6 and 7 is stopped accordingly.

The second and third speeds of the gearbox are engaged and disengaged in a way similar to that described above.

To take power from the gearbox input shaft 2, its drive shaft 25 is engaged via the half-coupling 91 with the PTO shaft.

In case the gearbox is employed in the transmission of a tractor where higher running speeds, greater traction power and wider range of speed gears are required, the auxiliary reducing gear unit 34 is provided on the gearbox housing 1. In this case a longer torsion bar is used, which with one of its ends is linked to the driven member 24 of the input shaft 2 and with the other end, to the shaft 85 of the reducing gear unit 34. Torque is transmitted from the driving member 24 to the driven member 25 of the input shaft 2 through the drive pinion 86, the intermediate gears 87 and the driven gear 88 of the half-coupling 89 which is associated via the linking member 90 with the half-coupling 91 fixed in place on the drive shaft 25 of the input shaft 2. Transmission of torque from the drive shaft 25 to the layshaft 6 and 7 is as described above.

In case the gearbox is employed as a reducing gear unit with the tractor used as a stationary power source, the friction clutches 61 and 62 of the reversing gears 22 and 23 are to be disengaged, whereas the brake drums 78 of the planetary reduction gears 63 and 64 are inoperative, whereby the second neutral position in the gearbox is provided. In this case power can be taken from the layshafts 6 and 7.

The herein-disclosed transmission gearbox with independent side power control in speed and direction features the following advantages.

The provision of the gearbox input shaft made up of two hollow members interlinked through a torsion bar allows the drive shaft of the input shaft to rotate either at a speed of the driving member or input shaft of that shaft or at a speed changed by an auxiliary reducing gear unit (either stepdown or step-up one) so as to make an optimum combination of the performances of both the traction vehicle and the implements and tools being employed.

When any of the forward speeds is engaged (in which node the tractors operate most of the working time), only two pairs of gears are in mesh, which fact considerably simplifies the gearbox design, decreases its dimensions and cuts down power losses due to friction in gear meshing, each of the pairs of gears being involved in transmitting one half of the power which corresponds to a single pitch point when the whole amount of power is transmitted.

The friction clutch of the reversing gear in the latter case engaged and the planetary reduction gear rotates as a whole solid, whereby losses of power due to friction in gear meshing are eliminated.

The provision of individual reversing gears on each side of the tractor makes it possible to reverse the output shafts independently of each other and to obtain the second neutral speed in the gearbox, thus effecting power takeoff from a stationary tractor by making use of the gearbox as a reducing gear unit in this case. In addition, the provision of the reversing coupling gears on the gearbox output shafts ensures unidirectional rotation of the layshafts which makes it practicable to utilize packings with oil deflectors.

Though this invention has been described herein with reference to the preferable embodiment thereof, it will be understood that minor changes in the details of construction may be made without departing from the spirit and scope of the invention, as will be readily understood by those skilled in the art. All these alterations and changes will be considered to be within the limits of the spirit and scope of the invention and the claims that follows.

We claim:

1. A transmission gearbox capable of providing a plurality of forward and reverse speeds for use with a tractor or the like comprising a housing, an input shaft located within said housing and being provided with a driving member and a driven member, a coupling element connecting said driving member to said driven member, layshafts located within said housing, continually meshing gears operatively communicating with said input shaft and said layshafts for transmitting torque from said input shaft to said layshafts, friction clutches causing said continually meshing gears to communicate with said layshafts, output shafts aligned with said layshafts, and reversing coupling gears interlocking when a forward speed is provided by said gearbox and for connecting said output shafts to said layshafts when a reverse speed is provided.

2. A transmission gearbox as set forth in claim 1, wherein said driving and driven members of said input shaft are hollow and said coupling element is a torsion bar, and said reversing coupling gears is provided with epicyclic reducing gears having friction clutches.

3. A transmission gearbox as claimed in claim 2, including band brake means, said epicyclic reducing gears having a driven member rigidly coupled to said brake means.

4. A transmission gearbox as claimed in claim 2, including an auxiliary reducing gear unit having driving and driven members, a torsion bar for coupling said driving members of said input shaft and said auxiliary reducing gear unit, the driven members of said reducing gear unit being operatively connected with the driven member of said input shaft.

5. A transmission gearbox as claimed in claim 4, including band brake means, said epicyclic reducing gears having a driven member rigidly coupled to said brake means.

6. A transmission gearbox as claimed in claim 1, including an auxiliary reducing gear unit having driving and driven members, a torsion bar for coupling said driving members of said input shaft and said auxiliary reducing gear unit, the driven members of said reducing gear unit being operatively connected with the driven member of said input shaft.

7. A transmission gearbox as claimed in claim 6, including band brake means, said epicyclic reducing gears having a driven member rigidly coupled to said brake means.

8. A transmission gearbox as claimed in claim 6, wherein said reducing gear unit is either stepdown or a step-up.